US012308200B2

(12) United States Patent
Teramoto

(10) Patent No.: US 12,308,200 B2
(45) Date of Patent: May 20, 2025

(54) LIGHT SOURCE APPARATUS

(71) Applicant: Ushio Denki Kabushiki Kaisha, Tokyo (JP)

(72) Inventor: Yusuke Teramoto, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 173 days.

(21) Appl. No.: 18/096,452

(22) Filed: Jan. 12, 2023

(65) Prior Publication Data

US 2023/0317397 A1 Oct. 5, 2023

(30) Foreign Application Priority Data

Mar. 30, 2022 (JP) ................................ 2022-056395

(51) Int. Cl.
*H01J 35/14* (2006.01)
*H01J 35/10* (2006.01)

(52) U.S. Cl.
CPC .............. *H01J 35/14* (2013.01); *H01J 35/10* (2013.01)

(58) Field of Classification Search
None
See application file for complete search history.

(56) References Cited

U.S. PATENT DOCUMENTS 5,995,584 A * 11/1999 Bhatt .................. H01J 35/1017 378/144
6,430,261 B1 * 8/2002 Bathe .................. F16C 32/0427 378/132
6,933,510 B2 * 8/2005 Zukavishvili ....... G03F 7/70033 378/119
7,230,258 B2 * 6/2007 Ruzic .................. G03F 7/70166 250/493.1
7,652,272 B2 * 1/2010 Ruzic .................. G03F 7/70916 355/76

(Continued)

FOREIGN PATENT DOCUMENTS

JP 2016181353 A * 10/2016
JP 6658324 B2 12/2017

OTHER PUBLICATIONS

Unpublished, Pending U.S. Appl. No. 17/899,772, filed Aug. 31, 2022 by Yusuke Teramoto, Related to the Current Application.

*Primary Examiner* — David P Porta
*Assistant Examiner* — Djura Malevic
(74) *Attorney, Agent, or Firm* — Yoshida & Associates LLC; Kenichiro Yoshida

(57) ABSTRACT

A light source apparatus includes a beam introduction section, a plate member, a raw material supply section, and a radiation extraction section. The beam introduction section introduces an energy beam. The plate member has a front surface and a back surface, is disposed at a location where the introduced energy beam is incident onto the front surface, and is rotatable around a direction orthogonal to the front surface as its rotation axis direction. The raw material supply section supplies plasma raw material to an incident area in the front surface to generate plasma. The radiation extraction section extracts and emits radiation from the generated plasma. The plate member is disposed such that the normal axis of the incident area in the front surface is off from a between-axes area configured between an incident axis of the energy beam incident onto the incident area and an emission axis of the radiation.

19 Claims, 6 Drawing Sheets

(56) References Cited

U.S. PATENT DOCUMENTS

| | | | | |
|---|---|---|---|---|
| 7,746,982 | B2 * | 6/2010 | Yoshii | H01J 35/104 378/132 |
| 7,763,872 | B2 * | 7/2010 | O'Reilly | G03F 7/70175 359/227 |
| 8,008,595 | B2 * | 8/2011 | Hergenhan | H05G 2/005 315/111.21 |
| 8,102,969 | B2 * | 1/2012 | Bittl | H01J 35/107 378/132 |
| 9,380,690 | B2 * | 6/2016 | Hemberg | H01J 35/08 |
| 9,480,136 | B2 * | 10/2016 | Teramoto | H01S 3/1643 |
| 10,588,210 | B1 * | 3/2020 | Vinokhodov | H05G 2/008 |
| 10,638,588 | B2 * | 4/2020 | Vinokhodov | H05G 2/008 |
| 10,672,584 | B2 * | 6/2020 | Teramoto | H01J 35/101 |
| 10,887,973 | B2 * | 1/2021 | Ivanov | G03F 7/70916 |
| 12,061,423 | B2 * | 8/2024 | Tsai | G03F 7/70916 |
| 2007/0230531 | A1 * | 10/2007 | Hergenhan | H05G 2/003 372/76 |
| 2007/0235666 | A1 * | 10/2007 | Ruzic | G03F 7/70033 250/504 R |
| 2011/0240890 | A1 * | 10/2011 | Govindaraju | H05G 2/001 250/504 R |
| 2019/0166679 | A1 * | 5/2019 | Vinokhodov | H05G 2/005 |
| 2019/0259557 | A1 * | 8/2019 | Teramoto | H01J 35/101 |
| 2020/0312639 | A1 * | 10/2020 | Tom | C23C 16/511 |
| 2023/0317397 | A1 * | 10/2023 | Teramoto | H01J 35/10 378/62 |
| 2024/0396288 | A1 * | 11/2024 | Heikman | H01S 5/320275 |

* cited by examiner

LIGHT SOURCE APPARATUS

CROSS-REFERENCE TO RELATED APPLICATION(S)

This application claims priority from Japanese Priority Patent Application No. 2022-056395 filed on Mar. 30, 2022. The entire teachings of the above application are incorporated herein by reference.

BACKGROUND ART

The present invention relates to a light source apparatus applicable to the emission of X-rays, extreme ultraviolet light, or the like.

X-rays have been conventionally used for medical, industrial, and research applications. In the medical field, X-rays are used for such applications as chest radiography, dental radiography, and computed tomography (CT). In the industrial field, X-rays are used for such applications as non-destructive testing and tomographic non-destructive testing to observe the inside of materials such as structures and welds. In the research field, X-rays are used for such applications as X-ray diffraction to analyze the crystal structure of materials and X-ray spectroscopy (X-ray fluorescence analysis) to analyze the constituent elements of materials.

X-rays can be generated using an X-ray tube, in which a pair of electrodes (anode and cathode) are provided. When a high voltage is applied between the anode and cathode while a cathode filament is being heated by flowing an electric current therethrough, negatively charged thermoelectrons that are generated at the filament collide with a target on the anode surface at high speed, generating X-rays from the target. In X-ray tubes, a technique is also known in which the target on the anode is a liquid metal jet, and this target is irradiated with an electron beam to produce X-rays with high brightness.

Extreme ultraviolet light (hereinafter referred to as EUV light) having a wavelength of 13.5 nm, which is in the soft X-ray region having a relatively long wavelength among X-rays, has been recently used for exposure light. The base material of a mask for EUV lithography, the mask being provided with fine patterns, is a reflective mirror having a stacked structure, which is provided with a multilayer film (e.g., molybdenum and silicon) for reflecting EUV light on a substrate made of low-thermal-expansion glass. The EUV mask is fabricated on the multilayer film by patterning a material that absorbs radiation having a wavelength of 13.5 nm.

The size of unacceptable defects in EUV masks is much smaller than that of conventional ArF masks, making its detection difficult. Hence, EUV masks are usually inspected using radiation having a wavelength that matches the wavelength operated on lithography, which is called an actinic inspection. For example, when performed using radiation having a wavelength of 13.5 nm, the actinic inspection can detect defects with resolution better than 10 nm.

EUV light source apparatuses generally include DPP (Discharge Produced Plasma) light source apparatuses, LDP (Laser Assisted Discharge Produced Plasma) light source apparatuses, and LPP (Laser Produced Plasma) light source apparatuses. The DPP type EUV light source apparatus applies high voltage between electrodes between which discharge gas containing EUV radiation species (plasma raw material in the gas phase) is supplied to generate a highdensity high-temperature plasma by the discharge, thus utilizing the extreme ultraviolet light radiated from the plasma.

The LDP light source apparatus is an improved version of the DPP light source apparatus. In the DPP light source apparatus, for example, a liquid high-temperature plasma raw material such as Sn (tin) or Li (lithium) containing EUV radiation species is supplied to the surface of the electrode (discharge electrode) at which the discharge occurs. The material is then irradiated with an energy beam such as a laser beam or an electron beam to vaporize the material, and then a high-temperature plasma is generated by discharge.

The LPP light source apparatus generates plasma by focusing a laser beam on a droplet that has been ejected in a form of a minute liquid droplet, which is the target material for EUV radiation, and by exciting the target material. The droplet is made of materials including tin (Sn) or lithium (Li).

In this way, the DPP method (LDP method) light source apparatus or the LPP method light source apparatus can be used as an EUV light source apparatus that generates EUV light in the soft X-ray region. Meanwhile, since DPP method (LDP method) light source apparatus uses discharge between the electrodes to generate plasma, debris caused by EUV raw materials is eventually likely to generate. In contrast, since the LPP method light source apparatus is designed to set a minute droplet made of tin, which is the EUV raw material, to be a target and focus a laser beam for excitation onto the target, thus making the configuration of the light source apparatus complex. In addition, in the LPP method light source apparatus, it is difficult to stably drop and supply the tin droplets, making the stable generation of EUV light difficult.

Japanese Patent No. 6658324 discloses a method in which a liquid target material for generating X-rays is applied to disk-shaped rotation bodies and the applied liquid material is irradiated with an energy beam (laser beam) to generate X-rays. This method is capable of obtaining high-brightness X-rays with a relatively simple configuration. Applying the method described in Japanese Patent No. 6658324 to an EUV light source apparatus corresponds to the LPP method. However, this method eliminates the need for supplying the EUV raw material in liquid in a form of a droplet. Hence, this method is capable of readily supplying the EUV material, and enables the liquid EUV material to be reliably irradiated with a laser beam, obtaining EUV radiation with a relatively simple configuration.

SUMMARY OF THE INVENTION

It is important to suppress the effects of debris in the above-mentioned light source apparatuses that emit X-rays, EUV light, or the like.

In view of the above circumstances, it is an object of the present invention to provide a light source apparatus capable of suppressing the effects of debris.

In order to achieve the above-mentioned object, a light source apparatus according to one aspect of the present invention includes a beam introduction section, a plate member, a raw material supply section, and a radiation extraction section. The beam introduction section introduces an energy beam. The plate member has a front surface and a back surface, is disposed at a location where the introduced energy beam is incident onto the front surface, and is rotatable around a direction orthogonal to the front surface as its rotation axis direction. The raw material supply section supplies plasma raw material to an incident area in the front surface onto which the energy beam is incident to generate plasma. The radiation extraction section extracts and emits radiation from the generated plasma. The plate member is disposed such that the normal axis of the incident area in the front surface is off from a between-axes area configured between an incident axis of the energy beam incident onto the incident area and an emission axis of the radiation extracted from the plasma.

In the light source apparatus, the plate member is configured to be rotatable. The front surface of the plate member is supplied with the plasma raw material and is irradiated with an energy beam. This generates plasma and emits radiation. The plate member is disposed such that the normal axis of the incident area onto which the energy beam is incident is off from the between-axes area, which is located between the incident axis of the energy beam and the emission axis of the radiation. This provides a light source apparatus capable of suppressing the effects of debris associated with the generation of plasma.

The light source apparatus may further include a chamber that accommodates the plate member. In this case, the beam introduction section may include an incident chamber connected to the chamber and an incident aperture that allows the energy beam to enter the chamber from the incident chamber. The plate member may be disposed such that the normal axis is off from the opening of the incident aperture.

The light source apparatus may further include a chamber that accommodates the plate member. In this case, the radiation extraction section may include an emission chamber connected to the chamber and an emission aperture that allows the radiation to enter the emission chamber from the chamber. The plate member may be configured such that the normal axis is off from the opening of the emission aperture.

The light source apparatus may further include a gas supply section that blows gas in a direction from the between-axes area toward the normal axis such that the normal axis is located downstream from the between-axes area.

The chamber may have an inside thereof maintained in a more reduced-pressure atmosphere than that of the incident chamber.

The incident chamber may be supplied with gas to increase its internal pressure.

The chamber may have an inside thereof maintained in a more reduced-pressure atmosphere than that of the emission chamber.

The emission chamber may be supplied with gas to increase its internal pressure.

The between-axes area may include a three-dimensional area constituted by extending a two-dimensional area between the incident axis and the emission axis in a plane including the incident axis and the emission axis, along the normal direction of the plane.

At least either of an angle formed with the incident axis and the normal axis or an angle formed with the emission axis and the normal axis may be configured to be included in a range from 30 degrees to 60 degrees.

Each of the angle formed with the incident axis and the normal axis and the angle formed with the emission axis and the normal axis may be configured to be included in a range from 30 degrees to 60 degrees.

The beam introduction section may include an incident protrusion protruding toward the incident area and including the incident aperture at the end of the incident protrusion.

The incident protrusion may have a cone shape with a cross-sectional area that decreases toward the end of the incident protrusion.

The radiation extraction section may include an emission protrusion protruding toward the incident area and including the emission aperture at the end of the protrusion.

The emission protrusion may have a cone shape with a cross-sectional area that decreases toward the end of the emission protrusion.

The light source apparatus may further include a voltage applying section that applies a voltage to the emission protrusion.

The radiation may include X-rays or extreme ultraviolet light.

The light source apparatus may further include a thickness adjustment mechanism that adjusts the thickness of the plasma raw material supplied to the front surface.

EFFECT OF THE INVENTION

As described above, the present invention is capable of suppressing the effects of debris. The effects described herein are not necessarily limiting; however, but they may be any of the effects described in this disclosure.

DETAILED DESCRIPTION OF THE EMBODIMENTS

Hereinafter, embodiments according to the present invention will be described with reference to the accompanying drawings.

Basic Configuration of Light Source Apparatus

Figure 1:
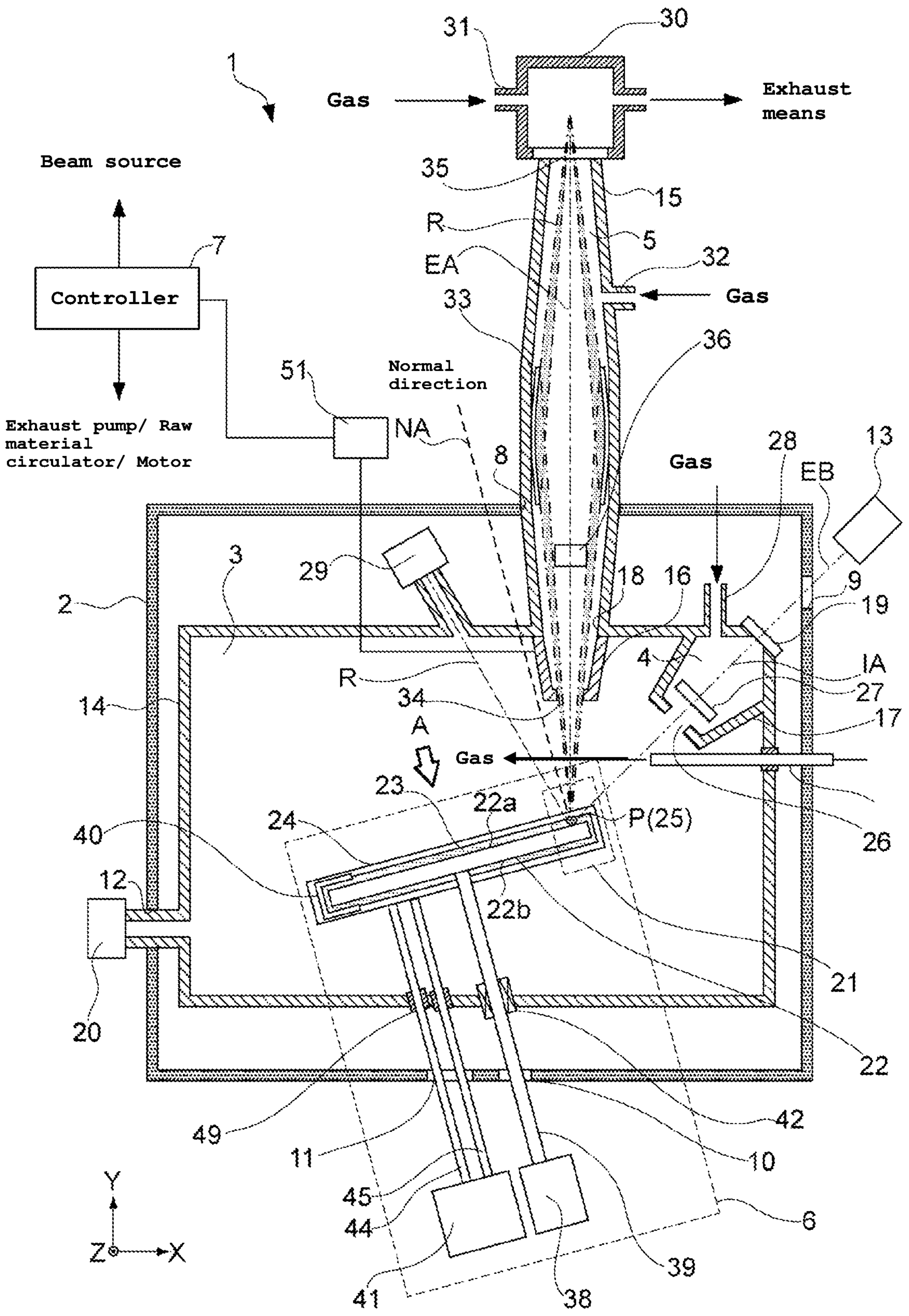
FIG. 1 is a schematic diagram illustrating a configuration example of a light source apparatus according to one embodiment of the present invention.

FIG. 1 is a schematic diagram illustrating a configuration example of a light source apparatus according to an embodiment of the present invention. FIG. 1 illustrates a schematic cross section of the light source apparatus 1 when the light source apparatus 1 is cut along the horizontal direction at a predetermined height from its installation surface and viewed from above. In FIG. 1, in order to facilitate the understanding of the configuration and operation of the light source apparatus 1, omitted is the illustration of the cross section of portions that does not need to be described on the configuration of the cross section, for example. Hereinafter, the X direction denotes as the left-right direction (the positive side of the X axis is the right side and the negative side is the left side), the Y direction denotes the front-rear direction (the positive side of the Y axis is the front side and the negative side is the rear side), and the Z direction denotes the height direction (the positive side of the Z-axis is the upper side, and the negative side is the lower side). Obviously, the application of the present technology is not limited to the direction in which the light source apparatus 1 is used.

The light source apparatus 1 is a light source apparatus of the LPP method capable of emitting the radiation R ranging from hard X-rays having a wavelength of 30 nm or less to soft X-rays (including EUV light), for example. Hence, the light source apparatus 1 can be used as an X-ray generator or an EUV light source apparatus (EUV radiation generator). Obviously, the present technology can also be applied to light source apparatuses that emit radiation in other wavelength bands.

The light source apparatus 1 includes an enclosure 2, a vacuum chamber 3, an energy beam incident chamber 4, a radiation emission chamber 5, a raw material supply mechanism 6, and a controller 7. The enclosure 2 is configured such that its external shape is approximately a cube. The enclosure 2 includes an emission hole 8 formed in the front face of the enclosure 2, an incident hole 9 formed in the right side face thereof, two through-holes 10 and 11 formed in the rear face thereof, and a through-hole 12 formed in the left side face thereof. The enclosure 2 can be made of any materials; for example, the enclosure is made of metal.

In the present embodiment, the radiation R is set to allow its emission axis EA to pass through the emission hole 8 in the front face and extend in the Y-direction (front-rear direction). The radiation R such as X-rays and EUV light is extracted along the emission axis EA and emitted through the emission hole 8 toward the front side. In the present embodiment, the energy beam EB is set to allow its incident axis IA to extend from the incident hole 9 on the right side face toward the rear side at an oblique angle to the left. As shown in FIG. 1, a beam source 13 that emits the energy beam EB is disposed outside the enclosure 2. The beam source 13 is disposed to allow the energy beam EB to enter the interior of the enclosure 2 along the incident axis IA. Examples of the energy beam EB include an electron beam or a laser beam. The beam source 13 can be configured to employ any configurations capable of emitting these energy beams EB.

The vacuum chamber 3, the energy beam incident chamber (hereinafter simply referred to as incident chamber) 4, and the radiation emission chamber (hereinafter simply referred to as emission chamber) 5 are spatially connected to each other. In other words, the vacuum chamber 3 and the incident chamber 4 are connected to each other. Similarly, the vacuum chamber 3 and the emission chamber 5 are connected to each other. In the present embodiment, the vacuum chamber 3, the incident chamber 4, and emission chamber 5 are constituted by a chamber body 14, an outer protrusion 15 protruding toward the front side from the front face of the chamber body 14, and two inner protrusions 16 and 17 protruding inward from the inner circumferential face of the chamber body 14. The chamber body 14, the outer protrusion 15, and the two inner protrusions 16 and 17 are made of metal materials, for example.

The chamber body 14 is configured such that its external shape is approximately a rectangular parallelepiped shape, and has its front, rear, left, and right faces that are arranged to face the front, rear, left and right faces of the enclosure 2, respectively. The chamber body 14 is disposed such that its right-front corner, which is between the front face and the right side face, is located in the incident axis IA of the energy beam EB.

As shown in FIG. 1, an emission hole 18 is formed in the front face of the chamber body 14. The emission hole 18 is formed along the emission axis EA of the radiation R, and in line with the emission hole 8 in the front face of the enclosure 2. The outer protrusion 15 is configured to protrude toward the front side from the circumferential edge of the emission hole 18 in the chamber body 14. The outer protrusion 15 is configured to protrude toward the front side more than the emission hole 8 of the enclosure 2 with being inscribed in the emission hole 8 of the enclosure 2. The inner protrusion 16 is configured to protrude inward from the circumferential edge of the emission hole 18 inside the chamber body 14. The space surrounded by the outer protrusion 15 and the inner protrusion 16 serves as the emission chamber 5. The outer protrusion 15 and the inner protrusion 16 themselves, which are the components constituting the emission chamber 5, can also be referred to as the emission chamber. The outer protrusion 15 and the inner protrusion 16 may be integrally formed with the chamber body 14, or they may be separately formed and then connected to the chamber body 14.

The emission chamber 5 is configured to have a cone shape with its central axis being aligned with the emission axis EA of the radiation R. The emission chamber 5 is configured to have a large cross-sectional area at its center portion in the direction of the emission axis EA of the radiation R, and have the cross-sectional area being decreased toward the front and rear ends. In other words, the emission chamber 5 is shaped to taper toward the front and rear ends.

An incident window 19 is formed in the right-front corner of the chamber body 14. The incident window 19 is formed along the incident axis IA of the energy beam EB, and in line with the incident hole 9 in the right side face of the enclosure 2. The inner protrusion 17 is configured to protrude inside the right-front corner of the chamber body 14 along the incident axis IA of the energy beam EB from a position surrounding the incident window 19. In the internal space of the chamber body 14, the space surrounded by the inner protrusion 17 serves as the incident chamber 4. The inner protrusion 17 and the right-front corner of the chamber body 14 themselves, which are the components constituting the incident chamber 4, can also be referred to as the incident chamber. The inner protrusion 17 may be integrally formed with the chamber body 14, or it may be separately formed and then connected to the chamber body 14.

The incident chamber 4 is configured to have a cone shape with its central axis being aligned with the incident axis IA of the energy beam EB. The incident chamber 4 is configured to have a cross-sectional area being decreased toward its end inside the chamber body 14 in the direction of the incident axis IA of the energy beam EB. In other words, the incident chamber 4 has a tapered shape toward the end thereinside.

In the internal space of the chamber body 14, the space excluding the internal space of the inner protrusion 16, which serves as the emission chamber 5, and the internal space of the inner protrusion 17, which serves as the incident chamber 4, serves as the vacuum chamber 3. The components themselves constituting the vacuum chamber 3 can also be referred to as the vacuum chamber. As shown in FIG. 1, the chamber body 14 has a portion that protrudes through the through-hole 12 in the left side face of the enclosure 2 to the outside of the enclosure 2, and the portion has a front end connected to an exhaust pump 20. The exhaust pump 20 exhausts the inside of the vacuum chamber 3 and depressurizes the vacuum chamber 3. This suppresses the attenuation of the radiation R generated in the vacuum chamber 3. The inside of the vacuum chamber 3 is not necessarily a vacuum atmosphere, provided that it is a reduced-pressure atmosphere with respect to the incident chamber 4 and the emission chamber 5. The inside of the vacuum chamber 3 may be supplied with an inert gas. The specific configuration of the exhaust pump 20 is not limiting, and any pump such as a vacuum pump can be used.

The raw material supply mechanism 6 is a mechanism for generating the plasma P in a plasma generation area 21 in the vacuum chamber 3 and emitting the radiation R (X-rays, EUV light). The raw material supply mechanism 6 includes a disk-shaped rotation body 22 for supplying raw material, and a container 24 that accommodates the liquid-phase plasma raw material (radiation raw material) 23. The rotation body 22 and the container 24 are disposed inside the vacuum chamber 3. As shown in FIG. 1, the disk-shaped rotation body 22 has an incident area 25 onto which the energy beam EB is incident. The rotation body 22 is disposed in the vacuum chamber 3 such that the incident area 25 is located at the intersection of the incident axis IA and the emission axis EA. The incident area 25 of the rotation body 22 is supplied with the plasma raw material 23 and irradiated with the energy beam EB incident thereon to generate the plasma P. The area (space) where the plasma P is generated in the vacuum chamber 3 becomes the plasma generation area 21. Accordingly, the plasma generation area 21 is an area corresponding to the position of the incident area 25 of the rotation body 22. In addition, the detail on the raw material mechanism 6 will be described later.

The controller 7 controls the operation of each component provided in the light source apparatus 1. For example, the controller 7 controls the operation of the beam source 13 and the exhaust pump 20. In addition, the controller 7 controls the operation of various motors, plasma raw material circulators, external voltage sources, etc., which will be described later. The controller 7 includes computer hardware circuits necessary for computers, such as CPUs and memories (RAM, ROM). A CPU loads a control program stored in a memory into a RAM and executes it to perform various processes. The controller 7 may use a programmable logic device (PLD) such as field programmable gate array (FPGA), and other devices such as application specific integrated circuit (ASIC). In FIG. 1, the controller 7 is schematically illustrated as a functional block; however, the controller 7 may be designed in any desired manner including the position in which the controller 7 is configured. In the present embodiment, the CPU of the controller 7 executes programs according to the present embodiment to execute the plasma generation method and the radiation emission method according to the present embodiment.

Hereinafter, the various chambers and the raw material supply mechanism 6, which constitute the light source apparatus 1, will be described in detail.

Incident Chamber

The incident chamber 4 includes the inner protrusion 17 at the right-front corner of the chamber body 14. The incident window 19 is provided in the right-front corner of the chamber body 14. The energy beam EB emitted from the beam source 13 enter the incident chamber 4 through the incident window 19 along the incident axis IA. Note that the incident axis IA of the energy beam EB can also be referred to as the optical axis (principal axis) of the energy beam EB entering the incident chamber 4.

The incident window 19 is made of a material that is transmissive to the energy beam EB and is designed with a thickness that can withstand a pressure difference between the inside and outside of the incident chamber 4. The incident window 19 can be made of a metal film such as titanium or aluminum when the energy beam EB is an electron beam. The incident window 19 can be made of glass material (quartz glass) when the energy beam EB is a laser beam. The incident window 19 can be made of any other materials that are transmissive to the energy beam EB.

The inner protrusion 17 protrudes toward the incident area 25 on a front surface 22*a* of the rotation body 22 and is provided with an incident aperture 26 at the front end of the protrusion. The incident aperture 26 is located in line with the incident window 19 along the incident axis IA of the energy beam EB. The incident aperture 26 allows the energy beam EB to be incident through the incident chamber 4 into the vacuum chamber 3. In other words, the energy beam EB traveling along the incident axis IA through the incident window 19 passes through the incident aperture 26 and enter the rotation body 22 located in the vacuum chamber 3.

The incident chamber 4 is provided with a capturing mechanism thereinside to capture the scattered plasma raw material 23 and debris. In the example shown in FIG. 1, provided is a rotary window 27 that is a plate-shaped rotation member for transmitting the energy beam EB and capturing the plasma raw material 23 and debris, as the capturing mechanism. The rotary window 27 is configured to be disk-shaped, for example. The rotary window 27 is provided with a rotation shaft of a motor attached to its center, which is not shown in the figure. The motor rotates the rotation shaft, which in turn rotates the rotary window 27. The motor is driven and controlled by the controller 7. The motor is disposed outside the enclosure 2, and the rotation shaft is connected to the rotary window 27 through through-holes that are formed in the enclosure 2 and the chamber body 14, which are not shown in the figure. A mechanical seal is used to introduce the rotation shaft into the chamber body 14, allowing the rotary window 27 to rotate while maintaining the atmosphere (gas atmosphere as will be described below) in the incident chamber 4. The rotation shaft that rotates the rotary window 27 is located off from the incident axis IA of the energy beam EB. This allows the energy beam EB to travel through the beam transmission area of the rotary window 27 without being interfered by the rotation shaft of the rotary window 27. Rotating the rotary window 27 makes it possible to increase the substantial area of the beam transmission area of the rotary window 27, achieving a longer service life of the rotary window 27 and reducing the frequency of replacement of the rotary window 27. Measures to be taken against the scattered plasma raw material 23 and debris will be discussed in detail later.

As shown in FIG. 1, the chamber body 14 is provided with a gas injection channel 28 that is connected to the incident chamber 4. Through the gas injection channel 28, gas is supplied to the incident chamber 4 from a gas supply system, which is omitted in the figure. The gas supplied is gas that has high transmittance to the energy beam EB, for example, a noble gas including argon (Ar) and helium (He). The gas is supplied to increase the pressure inside the incident chamber 4. In other words, supplying gas from the gas injection channel 28 to the incident chamber 4 enables the internal pressure of the incident chamber 4 to be maintained at a pressure sufficiently higher than the internal pressure of the vacuum chamber 3. The inner protrusion 17 has a cone shape having a smaller cross-sectional area toward the side of the protrusion (the side in which the incident aperture 26 is formed). The incident aperture 26 is provided at the front end of the inner protrusion 17. This configuration is favorable for supplying gas to increase the internal pressure of the incident chamber 4. In addition, the inner protrusion 17 configured in a cone shape contributes to reducing the space occupied by the inner protrusion 17 in the chamber body 14.

This allows for more flexibility in designing the arrangement of other components, thereby downsizing the apparatus.

In the present embodiment, the incident chamber 4, inner protrusion 17, incident aperture 26, and other components constitute the beam introduction section that introduces the energy beam. In the present embodiment, the inner protrusion 17 serves as the incident protrusion.

Emission Chamber

The emission chamber 5 has a cone-shape with the emission axis EA as its central axis, and the front end (front end of the outer protrusion 15) of the emission chamber 5 is connected to a utilization apparatus such as a mask inspection device. In the example shown in FIG. 1, an application chamber 30 is connected as a chamber that forms part of the utilization apparatus. The pressure inside the application chamber 30 may be atmospheric pressure. The interior of the application chamber 30 may be purged with gas (e.g., inert gas) introduced from a gas injection channel 31, if necessary. The gas inside the application chamber 30 may be exhausted by an exhaust means, which is omitted in the figure.

As shown in FIG. 1, the outer protrusion 15 is provided with a gas injection channel 32 that is connected to the emission chamber 5. Through the gas injection channel 32, gas is supplied to the emission chamber 5 from a gas supply device, which is omitted in the figure. The gas supplied is gas that has high transmittance to the radiation R, for example, a noble gas such as argon and helium. Argon and helium can be used as gas having high transmittance for both the energy beam EB and the radiation R. Hence, the same gas may be supplied to both the incident chamber 4 and the emission chamber 5. This case makes it possible to use a gas supply system in common, thus simplifying the apparatus. Obviously, the gas supplied to the incident chamber 4 may be different from the gas supplied to the emission chamber 5. The gas is supplied to increase the pressure inside the emission chamber 5. In other words, supplying gas from the gas injection channel 32 to the emission chamber 5 enables the internal pressure of the emission chamber 5 to be maintained at a pressure sufficiently higher than the internal pressure of the vacuum chamber 3.

Inside the emission chamber 5, provided is a collector (focusing mirror) 33 that guides and focuses the radiation R entering the emission chamber 5 into the utilization apparatus (inside the application chamber 30). In FIG. 1, the component of the radiation R that enters the emission chamber 5 and is focused is illustrated in hatching. The outer surface of the collector 33 is in contact with the inner surface of the emission chamber 5 (inner surface of the outer protrusion 15) for the purpose of cooling and alignment. The collector 33 may be, for example, a single-shell oblique-incidence reflector mirror. The collector 33 is made of a metal member such as aluminum (Al), nickel (Ni), or stainless steel.

The collector 33 is optionally provided with a reflective coating on the inner reflective surface thereof. The reflective coating that reflects the radiation R is suitably made of a material such as ruthenium (Ru). Instead of being a structure in which its body is coated with Ru, which is expensive, the collector 33 may be configured to have a body made of glass (silicon dioxide: SiO2) and to make its inner surface be polished to form a radiation reflecting surface. Although the collector made of glass has a lower reflectivity than the collector made of metal applied with a Ru coating, the material of the collector made of glass is much less expensive than that of the collector with a Ru coating, thereby enabling the collector 33 to be replaced more frequently.

The inner protrusion 16, which constitutes the emission chamber 5, protrudes toward the incident area 25 on the front surface **22*a* of the rotation body 22, and is provided with an emission aperture 34 at the front end of the protrusion. The emission aperture 34 is located in line with the emission hole 18 of the chamber body 14 and the emission hole 8 of the enclosure 2 along the emission axis EA of the radiation R. The emission aperture 34 allows the radiation R to enter the emission chamber 5 from the vacuum chamber 3. In other words, a portion of the radiation R emitted from the plasma P enters the collector 33 through the emission aperture 34. The radiation R that has entered the collector 33 is guided and focused by the collector 33 in the application chamber 30. Designing the opening area of the emission aperture 34 appropriately makes it possible to control the aperture angle of the radiation R entering the collector 33. Note that the emission axis EA of the radiation R can also be referred to as the optical axis (principal axis) of the radiation R introduced into the emission chamber 5** from the plasma P.

The inner protrusion 16 has a cone shape having a smaller cross-sectional area toward the side of the protrusion (the side in which the emission aperture 34 is formed). Hence, the inner protrusion 16 can also be referred to as a collector cone. The emission aperture 34 is provided at the front end of the inner protrusion 16, which has a cone shape. This configuration is favorable for supplying gas to increase the internal pressure of the emission chamber 5. In addition, the inner protrusion 16 configured in a cone shape contributes to reducing the space occupied by the inner protrusion 16 in the chamber body 14. This allows for more flexibility in designing the arrangement of other components, thereby downsizing the apparatus.

As shown in FIG. 1, a filter film 35 is provided between the emission chamber 5 and the application chamber 30. The filter film 35 serves to physically separate the plasma generation area 21 in the vacuum chamber 3 from the application chamber 30 (physically separate the space), preventing the scattered plasma raw material 23 and debris from entering the application chamber 30. This will be described later in detail. The filter film 35 is made of a material that transmits the radiation R generated in the plasma generation area 21. When the radiation R is X-rays, the filter film 35 is constituted by, for example, a beryllium thin film that has a very high transmittance for X-rays. When the radiation R is EUV light, the filter film 35 is made of zirconium (Zr), for example.

Although being supplied with gas, the inside of the emission chamber 5 has a reduced-pressure atmosphere because it is spatially connected to the vacuum chamber 3. In contrast, the inside of the application chamber 30 may have an atmospheric pressure as described above. In this case, there is a pressure difference between the emission chamber 5 and the application chamber 30. Accordingly, the filter film 35 has a thickness durable enough to withstand this pressure difference. In other words, the filter film 35 is configured to avoid destroying the reduced-pressure atmosphere in the emission chamber 5, which is spatially connected to the vacuum chamber 3.

A shielding member (central occultation) 36 is disposed inside the emission chamber 5. The shielding member 36 is located in line with the emission hole 18 of the chamber body 14, the emission hole 8 of the enclosure 2, and the filter film 35 along the emission axis EA of the radiation R. Among the radiation R emitted from the plasma P and entering the emission chamber 5, there can be the components of radiation that are not focused by the collector 33 and that travel in the emission chamber 5. At least part of this unfocused radiation components spread out while traveling. Typically, such radiation components are unusable with the utilization apparatus and often unnecessary. In the present embodiment, the shielding member 36 can block the radiation components that are not focused by the collector 33.

In the present embodiment, the emission chamber 5, the outer protrusion 15, the inner protrusion 16, the emission aperture 34, and other components constitute the radiation extraction section that extracts and emits radiation from the generated plasma. In addition, in the present embodiment, the inner protrusion 16 serves as the emission protrusion.

Raw Material Supply Mechanism

Figure 2:
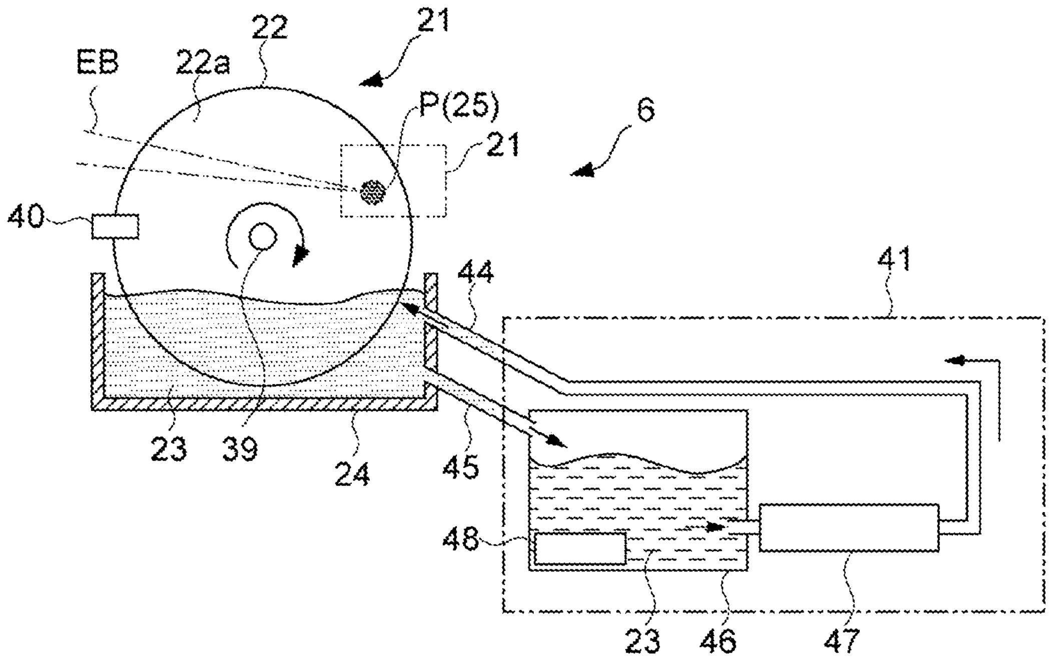
FIG. 2 is a schematic diagram illustrating a configuration example of a raw material supply mechanism.

FIG. 2 is a schematic diagram illustrating a configuration example of the raw material supply mechanism 6. FIG. 2 illustrates the rotation body 22 and the container 24 viewed from the direction of arrow A in FIG. 1. Accordingly, the front surface 22*a* of the rotation body 22 is illustrated in FIG. 2.

As shown in FIGS. 1 and 2, the raw material supply mechanism 6 includes the disk-shaped rotation body 22, the container 24, a motor 38, a rotation shaft 39, a skimmer 40, and a plasma raw material circulator 41.

The disk-shaped rotation body 22 has the front surface 22*a* and a back surface 22*b*, and includes the incident area 25 onto which the energy beam EB is incident and that is set at a predetermined position on the front surface 22*a*. Conversely, of the two main surfaces of the rotation body 22, the main surface where the incident area 25 is set for the energy beam EB to be incident onto is the front surface 22*a*. The opposite main surface is the back surface 22*b*. The rotation body 22 is made of a high-melting-point metal such as tungsten (W), molybdenum (Mo), or tantalum (Ta). The lower side of the rotation body 22 is partially immersed in the plasma raw material 23 stored in the container 24.

When X-rays are emitted as the radiation R, X-ray raw materials are used as the plasma raw material 23. The X-ray raw material is a metal that is in the form of liquid at room temperature. Examples of the X-ray raw material include gallium (Ga), and gallium alloys such as Galinstan (registered trademark), which is a eutectic alloy of gallium, indium (In), and tin (Sn). When EUV light is emitted as the radiation R, EUV raw materials are used as the plasma raw material 23. Examples of the raw material that emits EUV light include tin (Sn) and lithium (Li) that are in the form of liquid. Since Sn and Li are solid at room temperature, the container 24 is provided with a temperature control means, which is omitted from the figure. For example, when the EUV raw material is Sn, the container 24 is maintained at a temperature above the melting point of Sn.

The rotation shaft 39 of the motor 38 is connected to the center of the back surface 22*b* of the rotation body 22. The controller 7 controls the operation of the motor 38, which allows the rotation body 22 to rotate via the rotation shaft 39. The rotation shaft 39 is disposed to extend in a direction orthogonal to the front surface 22*a* of the rotation body 22. Hence, the rotation body 22 rotates around the direction orthogonal to the front surface 22*a*. The rotation shaft 39 passes through the through-hole 10 in the enclosure 2 and is introduced into the vacuum chamber 3 via a mechanical seal 42. The mechanical seal 42 allows the rotation shaft 39 to rotate while maintaining a reduced-pressure atmosphere in the vacuum chamber 3.

The rotation body 22 rotates around the rotation shaft 39 while a part of the lower side of the rotation body 22 is immersed in the plasma raw material 23 stored in the container 24. As a result, the plasma raw material 23 that has spread on the front surface 22*a* of the rotation body 22 due to its wettability with the front surface 22*a* of the rotation body 22 is pulled up from the raw material storage portion of the container 24 and is transported. Hence, the motor 38 and the rotation shaft 39 serve as a raw material supply section that apply the raw material to at least a part of the front surface 22*a* of the rotation body 22. As shown in FIG. 2, in the present embodiment, the incident area 25 onto which the energy beam EB is incident is set in the vicinity of the circumferential edge of the front surface 22*a* of the rotation body 22. The configuration and operation of the raw material supply section (motor 38 and rotation axis 39) are appropriately designed to supply this incident area 25 with the plasma raw material 23.

A skimmer 40 is disposed at a predetermined position on the circumferential edge of the rotation body 22 as a layer thickness adjustment section for adjusting the layer thickness of the plasma raw material 23 that has been supplied on the front surface 22*a* of the rotation body 22 to a predetermined thickness. The skimmer 40 is, for example, a structure having a channel structure, and is positioned with a predetermined gap in a manner that the rotation body 22 is sandwiched thereinside. The skimmer 40 serves as a scraper to scrape off part of the plasma raw material 23 that has been applied to the front surface 22*a* of the rotation body 22.

The interval between the front surface 22*a* of the rotation body 22 and the skimmer 40 corresponds to the layer thickness of the plasma raw material 23 in the incident area 25 of the front surface 22*a* of the rotation body 22 onto which the energy beam EB is incident. The skimmer 40 is disposed at a location such that the layer thickness of the plasma raw material 23 in the incident area 25 of the front surface 22*a* of the rotation body 22 can be appropriately adjusted to a predetermined thickness. Setting the interval between the front surface 22*a* of the rotation body 22 and the skimmer 40 appropriately allows the liquid raw plasma material 23 that has been applied to the rotation body 22 in the raw material storage portion of the container 24 to be adjusted such that the layer thickness on the rotation body 22 becomes a predetermined layer thickness when the liquid raw plasma material 23 passes through the skimmer 40 in response to the rotation of the rotation body 22.

The plasma raw material 23 on the rotation body 22, the thickness of which has been adjusted by the skimmer 40, is transported to the incident area 25, onto which the energy beam EB is incident, in response to the rotation of the rotation body 22. In other words, the direction of rotation of the rotation body 22 is a direction in which the plasma raw material 23 on the rotation body 22 passes through the skimmer 40 and then transported to the incident area 25. In the incident area 25, the plasma raw material 23 on the rotation body 22 is irradiated with the energy beam EB to generate the plasma P. The skimmer 40 makes it possible to nearly uniformly supply the plasma raw material 23 to the incident area 25. Stabilizing the thickness of the plasma raw material 23 in the incident area 25 is capable of stabilizing the intensity of the radiation R emitted from the plasma P. In the present embodiment, the skimmer 40 provides a thickness adjustment mechanism that adjusts the thickness of the plasma raw material that is supplied to the front surface.

The plasma raw material circulator 41 appropriately replenishes the container 24 with the plasma raw material 23 when the plasma raw material 23 is consumed due to the operation of generating the radiation R. The plasma raw material circulator 41 also serves as a temperature adjustment mechanism (cooling mechanism) for the plasma raw material 23.

As shown in FIG. 2, the plasma raw material circulator 41 includes a raw material inlet pipe 44, a raw material outlet pipe 45, a raw material storage tank 46, a raw material drive section (pump) 47, and a temperature adjustment mechanism 48. The raw material storage tank 46 stores the plasma raw material 23. The raw material inlet pipe 44 and the raw material outlet pipe 45 are disposed between the raw material storage tank 46 and the container 24 to communicate the raw material storage tank 46 with the container 24. The raw material drive section 47 is disposed in the raw material inlet pipe 44. Driving the raw material drive section 47 allows the plasma raw material 23 that has been stored in the raw material storage tank 46 to flow into the raw material inlet pipe 44, circulating the plasma raw material 23 in the circulation system of the raw material storage tank 46, the raw material inlet pipe 44, the container 24, and the raw material outlet pipe 45. Examples of the raw material drive section 47 include an electromagnetic pump capable of transporting liquid metal (plasma raw material 23) using magnetic force; however, other types of pumps may also be used.

In the present embodiment, the raw material storage tank 46 and the raw material drive section 47 are disposed outside the vacuum chamber 3 and also outside the enclosure 2. The raw material inlet pipe 44 and the raw material outlet pipe 45, which extend from the plasma raw material circulator 41 to the container 24, pass through the through-hole 11 in the enclosure 2, are introduced into the vacuum chamber 3 via a seal member 49, and are connected to the container 24. The seal member 49 allows the raw material inlet pipe 44 and the raw material outlet pipe 45 to penetrate from the outside to the inside of the vacuum chamber 3 while maintaining a reduced-pressure atmosphere in the vacuum chamber 3.

The plasma raw material 23 that has been applied onto the front surface 22*a* of the rotation body 22 is consumed at the area that is irradiated with the energy beam EB. Hence, in order to stably operate the generation of the radiation R (X-ray or EUV light) for a long period of time, a large volume of the plasma raw material 23 needs to be stored in the container 24. Meanwhile, the size of the vacuum chamber 3 of the light source apparatus 1 provides restrictions on the size of the container 24 that can be accommodated inside the vacuum chamber 3, thus there may be many cases in which the container 24 fails to store a large volume of the plasma raw material 23. Hence, the raw material storage tank 46 capable of storing a large volume of the plasma raw material 23 is disposed outside the vacuum chamber 3, and is configured to replenish the raw material storage portion of the container 24 with the plasma raw material 23 via the raw material inlet pipe 44. This configuration allows the amount of the plasma raw material 23 in the raw material storage portion of the container 24 to be maintained at a constant level over a long period of time, thus enabling the stable operation of generating the radiation R over a long period of time. In other words, the plasma raw material circulator 41 circulates the plasma raw material 23 between the raw material storage portion of the container 24 and the raw material storage tank 46 such that the amount of the plasma raw material 23 in the raw material storage portion of the container 24 is maintained at a constant level.

When the plasma raw material 23 that has been applied onto the front surface 22*a* of the rotation body 22 is irradiated with the energy beam EB, the radiation R is generated from the plasma raw material 23 (target), and at the same time, the rotation body 22 itself is heated. Whenever this heated rotation body 22 passes through the raw material storage portion of the container 24 in which the plasma raw material 23 is stored, the heat in the heated rotation body 22 is transferred to the plasma raw material 23 in the container 24. Hence, the temperature of the plasma raw material 23 in the container 24 gradually varies. When the viscosity of the plasma raw material 23 varies with temperature, the temperature variations of the plasma raw material 23 cause wettability variations of the rotation body 22 with respect to the plasma raw material 23, thereby varying the adhesion state of the plasma raw material 23 to the rotation body 22. As a result, the output of the radiation R may also vary.

The plasma raw material circulator 41 according to the present embodiment includes the raw material storage tank 46 that has a relatively large capacity outside the vacuum chamber 3 (outside the enclosure 2). Hence, even if the plasma raw material 23 that has varied in temperature in the raw material storage portion of the container 24 flows into the raw material storage tank 46 via the raw material outlet pipe 45, the temperature of the plasma raw material 23 in the raw material storage tank 46 does not vary much and remains nearly constant. The plasma raw material 23, the temperature of which is maintained nearly constant, flows into the container 24 via the raw material inlet pipe 44. In this way, circulating the plasma raw material 23 through the plasma raw material circulator 41 enables the temperature of the plasma raw material 23 in the container 24 to be maintained at a nearly constant level. Therefore, this configuration is also capable of stabilizing the adhesion state of the plasma raw material 23 to the rotation body 22, stabilizing the output of the radiation R.

In addition, the temperature of the plasma raw material 23 in the raw material storage tank 46 may be adjusted by the temperature adjustment mechanism 48 that is provided inside the raw material storage tank 46. Since the raw material storage tank 46 is disposed outside the vacuum chamber 3 (outside the enclosure 2), the temperature adjustment mechanism 48 can have a large capacity, which is unaffected by the size of the vacuum chamber 3. This makes it possible to reliably adjust the temperature of the plasma raw material 23 to a predetermined temperature in a short time.

In this way, utilizing the plasma raw material circulator 41 including the temperature adjustment mechanism 48 makes it possible to supply the raw material storage portion of the container 24 with the plasma raw material 23 while maintaining the temperature of the plasma raw material 23 at a constant level. For example, in the case that a liquid metal whose temperature in its liquid state is lower than room temperature is used as the plasma raw material 23, this configuration also makes it possible to supply the container 24 with the plasma raw material 23 in the liquid phase while maintaining the temperature thereof lower than room temperature. Alternatively, in the case that a liquid metal whose temperature in its liquid state is higher than room temperature is used as the plasma raw material 23, this configuration also makes it possible to supply the container 24 with the plasma raw material 23 in the liquid phase while maintaining the temperature thereof higher than room temperature.

As shown in FIG. 1, in the present embodiment, a radiation diagnosis section 29 is provided on the front side of the chamber body 14 and in the area spatially connected to the vacuum chamber 3. The radiation diagnosis section 29 is disposed at a position onto which the radiation R emitted in a direction different from the emission axis EA is incident. The radiation diagnosis section 29 measures the physical state of radiation R and includes a detector that detects the presence or absence of the radiation R and a measurement device that measures the output of the radiation R.

In the present embodiment, the rotation body 22 provides a plate member that has a front surface and a back surface, is disposed at a position where the introduced energy beam is incident on the front surface, and rotates around a direction orthogonal to the front surface as its rotation axis direction. The raw material supply mechanism 6 provides a raw material supply section that generates plasma by supplying the plasma raw material to the incident area where the energy beam is incident on the front surface thereof. The vacuum chamber 3 also serves as a chamber that accommodates the plate member.

Process of Generating the Radiation R

Raw Material Supply

The rotation body 22 rotates around the rotation shaft 39 with the state in which a part of the lower side of the rotation body 22 is immersed in the plasma raw material 23 stored in the container 24. The plasma raw material 23 is pulled up from the raw material storage portion of the container 24 in a manner that it spreads over the front surface 22*a* of the rotation body 22 due to its wettability with the front surface 22*a* of the rotation body 22. The plasma raw material 23 is then transported to the incident area 25 onto which the energy beam EB is incident, with the plasma raw material 23 that has been applied on the front surface 22*a* of the rotation body 22. As shown in FIG. 2, the direction of rotation of the rotation body 22 is a direction in which the plasma raw material 23 supplied to the front surface 22*a* of the rotation body 22 is pulled up from the raw material storage portion of the container 24, passes through the skimmer 40, and reaches the plasma generation area 21 (incident area 25).

Plasma Generation

The plasma raw material 23, which has passed the skimmer 40 and the layer thickness of which on the rotation body 22 has been adjusted, reaches the incident area 25. Then the energy beam EB is emitted from the beam source 13 along the incident axis IA toward the incident area 25. The energy beam EB passes through the incident hole 9, the incident window 19, the rotary window 27, and the incident aperture 26, and is incident onto the incident area 25 on which the plasma raw material 23 has been supplied. The energy beam EB incident onto the incident area 25 heats and excites the plasma raw material 23 present on the incident area 25 to generate a high-temperature plasma P. The high-temperature plasma P generated in the plasma generation area 21 emits the radiation R having a predetermined wavelength.

Extraction of the Radiation R

The radiation R emitted from the high-temperature plasma P travels in various directions. Of the radiation R, the radiation R incident into the emission chamber 5 passes through the emission chamber 5 and is guided to the utilization apparatus (application chamber 30) such as a mask inspection apparatus. In other words, of the radiation R emitted from the high-temperature plasma P, the component that enters the emission chamber 5 is extracted to the outside along the emission axis EA.

Countermeasures Against Scattering Plasma Raw Material 23 and Debris

In the process of supplying plasma raw material 23, the rotation of the rotation body 22 often causes the plasma raw material 23 adhering to the front surface 22*a* of the rotation body 22 to be scattered by a centrifugal force. In the process of generating plasma P, when the plasma raw material 23 applied on the rotation body 22 is irradiated with the energy beam EB, a part of the plasma raw material 23 vaporizes. At that time, a part of the plasma raw material 23 (particles of the plasma raw material 23) is released as debris. For example, ions, neutral particles, electrons, or the like are released as debris together with the radiation R. The generation of the plasma P may also involve the sputtering of the rotation body 22, thus releasing material particles of the rotation body 22 as debris.

The light source apparatus 1 according to the present embodiment employs technology that is capable of suppressing the effects of the scattered plasma raw material 23 and debris generated by the radiation of the energy beam EB. This point will be described below.

When the scattered plasma raw material 23 or debris enters the incident chamber 4 through the incident aperture 26, the plasma raw material 23 or debris may adhere to the incident window 19. In this case, when the energy beam EB is a laser beam, for example, the intensity of the laser beam is reduced by the plasma raw material 23 and debris adhering to the injection window 19. As a result, the intensity of the radiation R extracted from the plasma P may be reduced.

In the light source apparatus 1 according to the present embodiment, the inside of the vacuum chamber 3 is maintained in a more reduced-pressure atmosphere than that of the incident chamber 4. Hence, gas supplied from the gas injection channel 28 into the incident chamber 4 flows from the incident aperture 26 toward the vacuum chamber 3. This prevents the scattered plasma raw material 23 and debris from entering the incident chamber 4 through the incident aperture 26. The inner protrusion 17, which constitutes the incident chamber 4, has a cone-shape and is provided with the incident aperture 26 at its end. Hence, supplying gas from the gas injection channel 28 into the incident chamber 4 enables the internal pressure of the incident chamber 4 to be maintained at a pressure sufficiently higher than the internal pressure of the vacuum chamber 3. This makes it more difficult for the plasma raw material 23 and debris to enter the injection chamber 4 from the incident aperture 26. Furthermore, the formation of the incident aperture 26 itself is advantageous in suppressing the entry of the plasma raw material 23 and debris into the incident chamber 4.

The rotary window 27 is also disposed in the incident chamber 4. This makes it possible to sufficiently suppress the adhesion of the plasma raw material 23 and debris to the incident window 19. Suppressing the entry of the plasma raw material 23 and debris into the incident chamber 4 leads to extending the lifetime of the rotary window 27 and reducing the replacement frequency of the rotary window 27.

The vacuum chamber 3 has an inside thereof maintained in a more reduced-pressure atmosphere than that of the emission chamber 5. Hence, gas supplied from the gas injection channel 32 into the emission chamber 5 flows from the emission aperture 34 toward the vacuum chamber 3. This prevents the scattered plasma raw material 23 and debris from entering the emission chamber 5 through the emission aperture 34. The outer protrusion 15 and the inner protrusion 16, which constitute the emission chamber 5, each have a cone-shape, and is provided with the emission aperture 34 at their ends thereinside. Hence, supplying gas from the gas injection channel 32 into the emission chamber 5 enables the internal pressure of the emission chamber 5 to be maintained at a pressure sufficiently higher than the internal pressure of the vacuum chamber 3. This makes it more difficult for the plasma raw material 23 and debris to enter the emission chamber 5 from the emission aperture 34. Furthermore, the formation of the emission aperture 34 itself is advantageous in suppressing the entry of the plasma raw material 23 and debris into the emission chamber 5. The formation of the inner protrusion 16 also enables the emission aperture 34 to be disposed close to the plasma P that is to be generated. This leads to reducing the opening area of the emission aperture 34 for capturing the necessary radiation R. Therefore, this is advantageous to suppress the entry of the plasma raw material 23 and debris into the emission chamber 5.

When the radiation R is EUV light and the plasma raw material is Sn, for example, the most of the scattered plasma material 23 and debris are Sn. Since Sn has a melting point of approximately 232° C., it may solidify and deposit when it reaches the outer surface or inner surface of the inner protrusion 16. As the deposition progresses, the emission aperture 34 may become blocked by the deposited Sn. To prevent such problems, the inner protrusion 16 may be heated and maintained above the melting point of the plasma raw material 23 by heating means or temperature control means, which are omitted in the figure. This prevents the blockage of the emission aperture 34.

As shown in FIG. 1, an external voltage source 51 may be provided to apply a positive or negative voltage to the inner protrusion 16. Applying a voltage to the inner protrusion 16 generates an electric field, which in turn can repel ionic debris from the inner protrusion 16 or divert the traveling direction of the debris away from the direction of entering the emission chamber 5. In this case, the inner protrusion 16 is electrically insulated from other components such as the vacuum chamber 3 by an insulator made of ceramic material or the like, which is not shown. The operation of the external voltage source 51 is controlled by the controller 7. In the present embodiment, the external voltage source 51 provides the voltage applying section that applies voltage to the emission protrusion.

The filter film 35 is provided at the front end of the emission chamber 5. The filter film 35 can block the scattered plasma raw material 23 and debris from entering the application chamber 30. Accumulating the plasma raw material 23 and debris on the surface of the filter film 35 (the front surface on the emission chamber 5 side) gradually decreases the transmittance of radiation R. The filter film 35 may be configured to be movable including rotatable such that an area where no debris and other materials are deposited is exposed on the emission chamber 5 side when, for example, debris and other materials are deposited on the filter film 35 to some extent. The filter film 35 may be configured to be interchangeable. Adopting such a configuration can suppress the effects of the scattered plasma raw material 23 and debris.

The shielding member 36 is disposed in the emission chamber 5. The shielding member 36 can prevent debris and other materials traveling along the emission axis EA or its vicinity from reaching the filter film 35. In particular, part of the debris moves at a relatively high speed, potentially damaging the filter film 35 when it directly collides with the filter film 35. In the present embodiment, the shielding member 36 can prevent debris and other material from colliding with the filter film 35, thereby preventing damage to the filter film 35. Therefore, this configuration is capable of extending the service life of the filter film 35.

Figure 3:
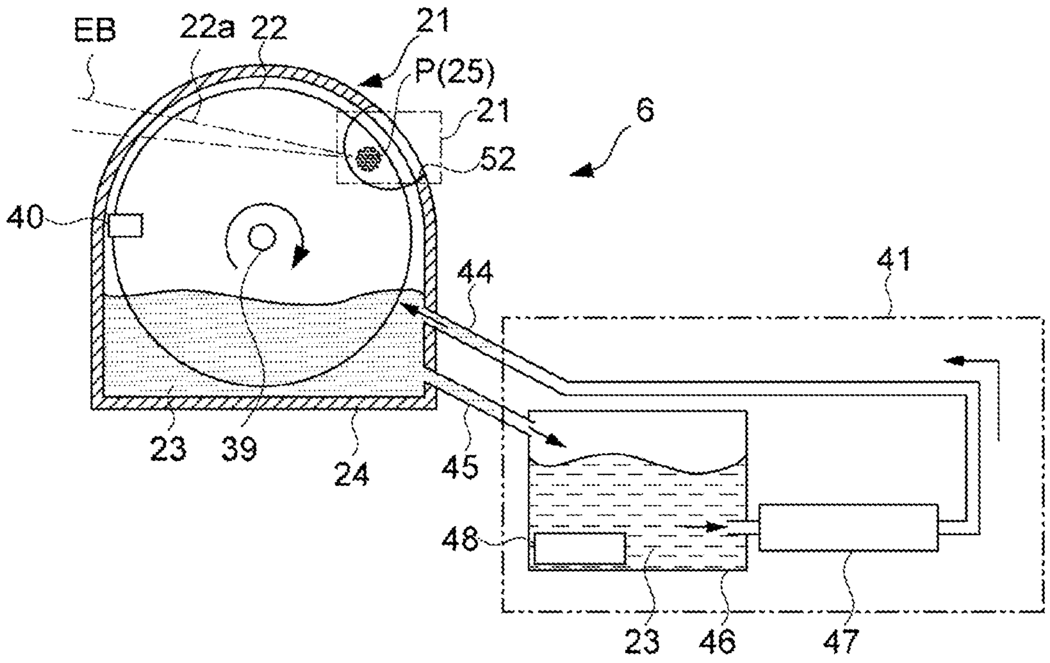
FIG. 3 is a schematic diagram illustrating another configuration example of a container applicable to the light source apparatus.

FIG. 3 is a schematic diagram illustrating another configuration example of a container applicable to the light source apparatus 1. In the example shown in FIG. 3, the container 24 is configured as a cover structure, which can enclose nearly the entire rotation body 22. The container 24 is provided with an opening 52 at a position corresponding to the incident area 25 set on the front surface 22*a* of the rotation body 22. The energy beam EB is incident onto the incident area 25 through the opening 52 to generate the plasma P. In addition, the radiation R is extracted from the plasma P through the opening 52 and is emitted through the emission chamber 5. Configuring the container 24 as a cover structure allows the plasma raw material 23 scattered from the rotation body 22 to adhere to the inner walls of the container 24, except for the opening 52 of the container 24. The plasma raw material 23 that has adhered to the inner walls moves to the raw material storage portion at the bottom of the container 24. Hence, the plasma raw material 23 hardly disperses into the space inside the vacuum chamber 3, which is the space outside the container 24. Therefore, this configuration is capable of sufficiently preventing the scattered plasma raw material 23 from adhering to the inner walls of the vacuum chamber 3.

Arrangement Configuration of the Rotation Body 22

Figure 4:
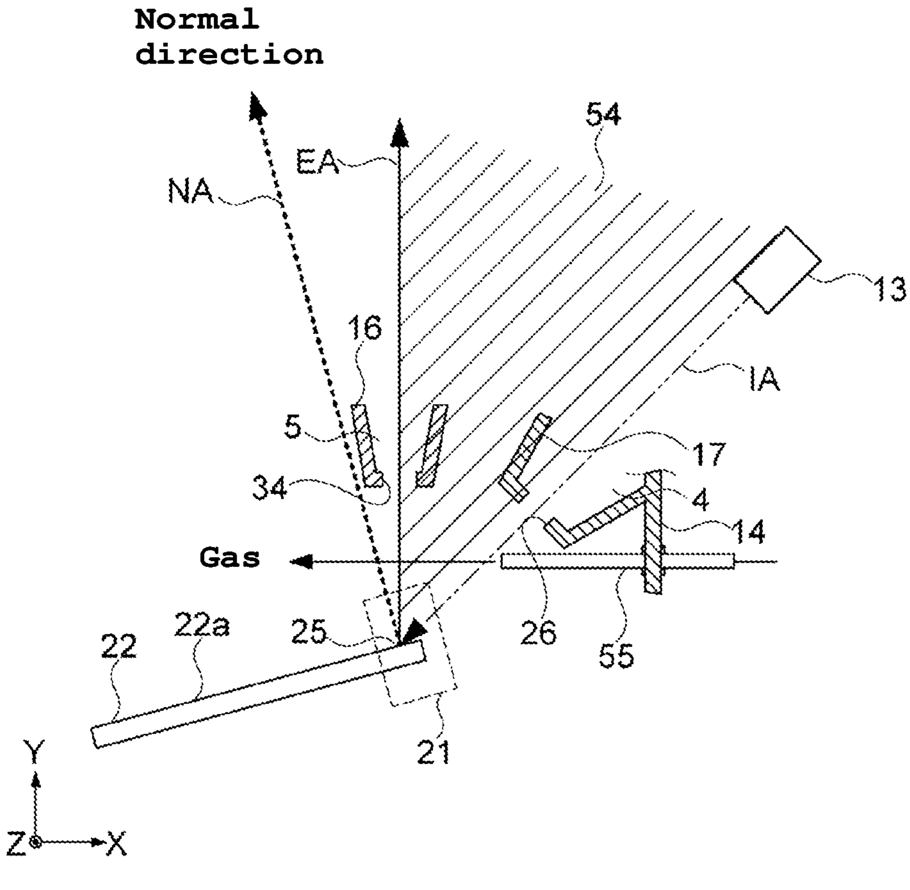
FIG. 4 is a schematic diagram describing an arrangement configuration of a rotation body.

In the light source apparatus 1, a new technology has been adopted for the arrangement configuration of the rotation body 22 to address debris. FIGS. 4 to 6 are schematic diagrams to describe the arrangement configuration of the rotation body 22.

In the light source apparatus 1, the arrangement configuration of the rotation body 22 is suitably determined based on the mutual positional relationship among the incident axis IA of the energy beam EB entering the incident area 25 of the rotation body 22, the emission axis EA of the radiation R extracted from the plasma P, and a normal axis NA in the incident area 25 of the front surface 22*a* of the rotation body 22. The normal axis NA is an axis extending along a normal direction from the point at which the energy beam EB in the incident area 25 is incident.

As shown in FIG. 4, the rotation body 22 is disposed such that the incident axis IA, the emission axis EA, and the normal axis NA are all different from each other in the light source apparatus 1. In addition, the rotation body 22 is disposed such that the normal axis NA in the incident area 25 of the front surface 22*a* is off from a between-axes area 54 configured between the incident axis IA of the energy beam EB entering the incident area 25 and the emission axis EA of the radiation R extracted from the plasma P. In other words, the rotation body 22 is disposed such that the normal axis NA does not pass through the between-axes area 54 between the incident axis IA and the emission axis EA.

When the plasma raw material 23 is supplied on a flat surface and irradiated with the energy beam EB, the debris released in response to the vaporization of the plasma raw material 23 is released most along the normal direction of the area onto which the energy beam EB is incident. In other words, a large amount of debris is released along the normal axis NA, which extends along the normal direction thereof. In the light source apparatus 1 according to the present embodiment, the normal axis NA is located differently from each of the incident axis IA and the emission axis EA. This allows each of the incident aperture 26 and the emission aperture 34 to be disposed at a location off from a direction from which much of the debris is released with the generation of the plasma P. Therefore, this configuration is capable of suppressing the debris from entering the incident chamber 4 and the emission chamber 5.

Moreover, the rotation body 22 is located such that the normal axis NA is off from the opening of the incident aperture 26. This makes it possible to further suppress the entry of debris into the incident chamber 4. Similarly, the rotation body 22 is located such that the normal axis NA is off from the opening of the emission aperture 34. This makes it possible to further suppress the entry of debris into the emission chamber 5. As shown in FIG. 4, in the present embodiment, the normal axis NA is also configured to be off from the opening of the incident aperture 26 and the opening of the emission aperture 34. Therefore, this configuration is capable of sufficiently suppress the entry of debris into the incident chamber 4 and the emission chamber 5.

As shown in FIGS. 1 and 4, the present embodiment is provided with a gas nozzle 55 at the rear side of the incident chamber 4, extending in the left-right direction. The gas nozzle 55 is disposed in the right side face of the chamber body 14 via a seal member or the like. The gas nozzle 55 is connected to a gas supply device, which is omitted in the figure, and supplies gas to the chamber body 14.

In the example shown in FIGS. 1 and 4, the normal axis NA in the incident area 25 of the rotation body 22 is located at a position of the left side off from the between-axes area 54 between the incident axis IA and the emission axis EA when the light source apparatus 1 is viewed from above. Then, gas is blown by the gas nozzle 55 from the right side of the between-axes area 54 toward the left side thereof along the left-right direction. In other words, the gas is blown in a direction that traverses the incident axis IA, the emission axis EA, and the normal axis NA; it is a direction that finally reaches the normal axis NA. This makes it possible to move the debris, which is emitted most along the normal axis NA in the incident area 25, in a direction away from the incident axis IA and the emission axis EA. This configuration is capable of further suppressing the entry of debris into the incident chamber 4 and emission chamber 5. Increasing the gas velocity can also increase the effectiveness of suppressing the entry of debris into the incident chamber 4 and the emission chamber 5.

In this way, the gas is blown in a direction from the between-axes area 54 toward the normal axis NA such that the normal axis NA is located downstream from the between-axes area 54. This makes it possible to sufficiently suppress the entry of debris released with the generation of plasma P into the incident chamber 4 and the emission chamber 5. Examples of the gas include noble gases such as argon and helium. The same type of gas supplied to the inside of the incident chamber 4 and the emission chamber 5 can also be used, for example.

Figure 5A:
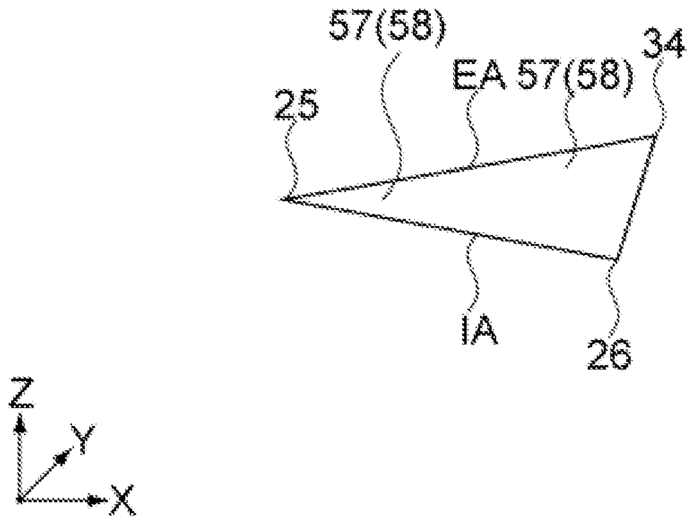
FIG. 5A is a schematic diagram describing a between-axes area in detail.
Figure 5B:
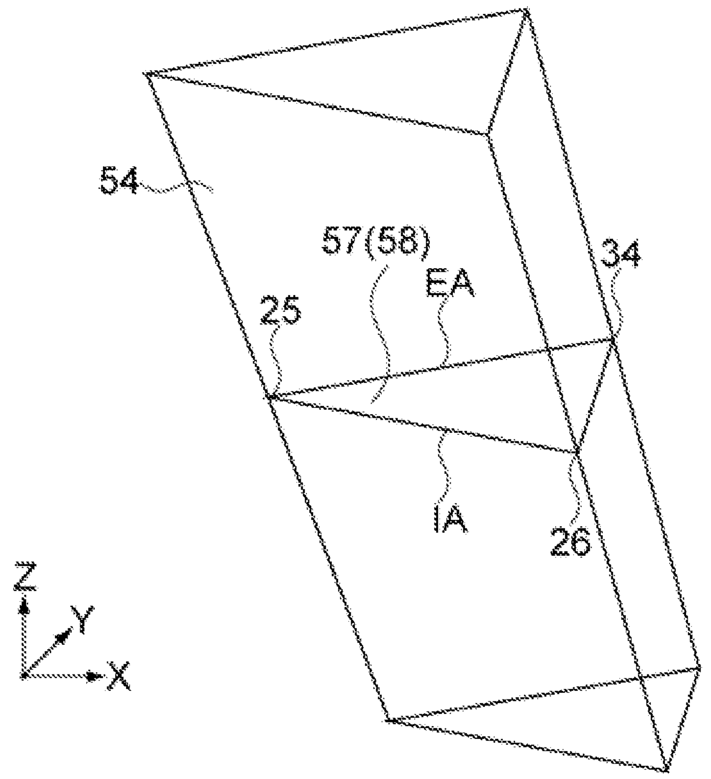
FIG. 5B is a schematic diagram describing a between-axes three-dimensional area in detail.
Figure 6:
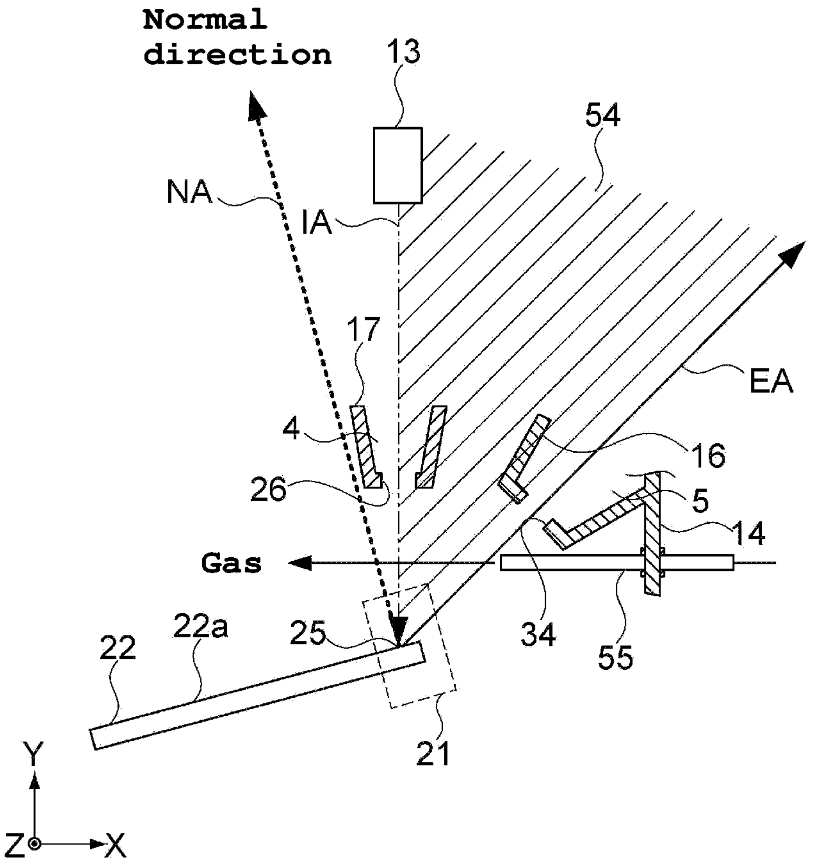
FIG. 6 is a schematic diagram illustrating another arrangement configuration of the rotation body.

FIGS. 5A and 5B are schematic diagrams that describes the between-axes area 54 in detail. In the light source apparatus 1, the incident axis IA of the energy beam EB and the emission axis EA of the radiation R are set in a three-dimensional space. As illustrated in FIG. 5A, a plane 57 including the incident axis IA and the emission axis EA is assumed. In the example illustrated in FIGS. 5A and 5B, the plane 57 is a plane that is not parallel to any of the XY plane, the YZ plane, and ZX plane. Specifically, it is a plane whose front side is inclined to be lower (−Z direction) with respect to the XY plane. Obviously, the embodiments are not limited to such a plane. As shown in FIG. 5B, a two-dimensional area 58 between the incident axis IA and the emitting axis EA on the plane 57 including the incident axis IA and the emitting axis EA is moved along the normal direction of the plane 57. The between-axes area 54 can define a three-dimensional area constituted by extending the two-dimensional area 58 to the upper side and the lower side along the normal direction to the plane 57. The rotation body 22 is located at a position such that the normal axis NA in the incident area 25 (incident point) is off from the between-axes area 54. In addition, the gas is blown in a direction from the between-axes area 54 toward the normal axis NA such that the normal axis NA is downstream from the between-axes area 54 when the gas is blown. Satisfying this condition allows the direction in which the gas is blown to be set to any direction. For example, the gas may be blown from an oblique direction of intersecting with the two-dimensional area 58.

In the example shown in FIG. 5B, the two-dimensional area 58 is defined as a triangular area connecting the position of the incident aperture 26 in the incident axis IA, the position of the emission aperture 34 in the emission axis EA, and the incident area 25. Obviously, the examples are not limited to this; the two-dimensional area 58 may be defined using another point in the incident axis IA and another point in the emission axis EA. The two-dimensional area 58 may also be defined in a manner that it includes the directions of extending each of the incident axis IA and the emission axis EA without defining points in the incident axis IA and the emission axis EA. In this case, the two-dimensional area 58 is not a triangular shape, but a two-dimensional area extending in the direction of extending each of the incident axis IA and the emission axis EA.

Making the angle between the incident axis IA and the normal axis NA of the energy beam EB large is capable of suppressing the debris released the most along the normal axis NA from entering the incident chamber 4. Similarly, making the angle between the emission axis EA of radiation R and the normal axis NA large is capable of suppressing the debris released the most along the normal axis NA from entering the incident chamber 4. The angle between the incident axis IA and the normal axis NA can be defined, for example, by an intersection angle in the plane including the incident axis IA and the normal axis NA. Similarly, the angle between the emission axis EA and the normal axis NA can be defined, for example, by an intersection angle in the plane including the emission axis EA and the normal axis NA.

For example, the light source apparatus 1 is configured such that at least either the angle between the incident axis IA and the normal axis NA or the angle between the emission axis EA and the normal axis NA is included in a range of 30 degrees to 60 degrees. This makes it possible to suppress the effects of debris. The light source apparatus 1 may also be configured such that each of the angle between the incident axis IA and the normal axis NA and the angle between the emission axis EA and the normal axis NA is included in a range from 30 to 60 degrees. This case also makes it possible to suppress the effects of debris.

As shown in FIG. 6, it is also possible to swap the arrangement of the incident chamber 4 and that of the emission chamber 5. In the configuration example shown in FIG. 4, the incident axis IA is located farther from the normal axis NA than the emission axis EA. Hence, the configuration example shown in FIG. 4 is capable of further suppressing debris from entering the incident chamber 4 than the emission chamber 5. In the configuration example shown in FIG. 6, the emission axis EA is located farther from the normal axis NA than the incident axis IA. Hence, the configuration example shown in FIG. 6 is capable of suppressing debris from entering the emission chamber 5 than the incident chamber 4. In this way, of the incident chamber 4 and emission chamber 5, it is possible to design a configuration in which the chamber that is desired to suppress the entry of debris is away from the normal axis NA. This configuration is capable of sufficiently suppressing the effects of debris.

In the light source apparatus 1 according to the present embodiment, the front surface 22*a* of the rotation body 22, which is configured to be rotatable, is supplied with the plasma raw material 23, and irradiated with the energy beam EB. This generates the plasma P and emits the radiation R. The rotation body 22 is disposed such that the normal axis NA in the incident area 25 where the energy beam EB enter is off from the between-axes area 54 between the incident axis IA of the energy beam EB and the emission axis EA of the radiation R. This makes it possible to suppress the effects of debris associated with the generation of plasma P.

In the light source apparatus 1, the incident area 25 onto which the energy beam EB is incident is set when one of the two main surfaces 22*a* of the plate-shaped rotation body 22 is considered to be the front surface 22*a*. This makes the design of apparatus easier compared to the case where the energy beam EB is incident onto the end (side) face of the rotation body 22, for example, simplifying the apparatus. Moreover, this can improve the degree of freedom in, for example, designing the arrangement of each component. When the plasma raw material (radiation material) supplied to the rotation body 22 is liquid, depending on the rotation speed of the rotation body 22, the plasma raw material may detach from the end face of the rotation body 22 and scatter as droplets. In other words, the unstable state of the plasma raw material supplied to the end face (side face) of the rotation body 22 highly causes the shape of the plasma raw material (thickness of the plasma raw material) in the area irradiated with the energy beam EB on the end face to be unstable, leading to the unstable radiation intensity emitted from the plasma. Hence, it is preferable to irradiate the energy beam EB on the front surface 22*a* of the rotation body 22 rather than on the end face (side face) thereof.

OTHER EMBODIMENTS

The present invention is not limited to the embodiments described above, and can adopt various other embodiments.

The light source apparatus, the rotation body, the various chambers, the raw material supply mechanism, and other configurations described with reference to the drawings are merely one embodiment and may be arbitrarily modified to the extent not to depart from the intent of the present technology. In other words, any other configurations may be adopted to implement this technology.

In the present disclosure, words such as "about", "nearly", and "approximately" are suitably used to readily understand the explanation. On the other hand, there is no clear difference between the cases in which these words "about", "nearly", and "approximately" are used and the cases in which they are not used. In other words, in the present disclosure, concepts that define shape, size, position relationship, and state, such as "center", "middle", "uniform", "equal", "same", "orthogonal", "parallel", "symmetrical", "extending", "axial direction", "cylindrical shape", "cylindrical hollow shape", "ring shape", and "annular shape", are concepts including "substantially center", "substantially middle", "substantially uniform", "substantially equal", "substantially same", "substantially orthogonal", "substantially parallel", "substantially symmetrical", "substantially extending", "substantially axial direction", "substantially cylindrical shape", "substantially cylindrical hollow shape", "substantially ring shape", and "substantially annular shape". The concepts also include concepts having states in a predetermined range (e.g., ±10% range) with respect to, for example, "exactly center", "exactly middle", "exactly uniform", "exactly equal", "exactly same", "exactly orthogonal", "exactly parallel", "exactly symmetrical", "exactly extending", "exactly axial direction", "exactly cylindrical shape", "exactly cylindrical hollow shape", "exactly ring shape", "exactly annular shape", and the like. Hence, even when the words such as "about", "nearly", and "approximately" are not added, the concepts may include those that are expressed by adding "about", "nearly", "approximately", and the like. Conversely, states expressed by adding "about", "nearly", "approximately", and the like do not necessarily exclude their exact states.

In the present disclosure, expressions using the term "than" such as "greater than A" and "less than A" are expressions that comprehensively include concepts that include the case that is equal to A and concepts that do not include the case that is equal to A. For example, "greater than A" is not limited to the case where it does not include "equal to A"; however, it also includes "equal to or greater than A". Also, "less than A" is not limited to "less than A"; it also includes "equal to or less than A". Upon the implementation of the present technology, specific settings and other settings are suitably adopted from the concepts that are included in "greater than A" and "less than A" to achieve the effects described above.

Among the characteristic portions according to the present technology described above, it is also possible to combine at least two of the characteristic portions. In other words, the various characteristic portions described in each embodiment may be optionally combined without being restricted to the embodiments. The various effects described above are merely examples and are not limitative; other effects may also be achieved.

What is claimed is:

1. A light source apparatus comprising:

a beam introduction section having an incident aperture and an incident protrusion for introducing an energy beam along a predetermined incident axis through the incident aperture in the incident protrusion;

a plate member having a rotational axis, a front surface and a back surface parallel to the front surface so that the introduced energy beam is incident onto an incident area of the front surface, the plate member being rotatable around the rotational axis that is orthogonal to the front surface as its rotation axis direction while a normal axis is parallel to the rotational axis and located in the incident area;

a raw material supply section that supplies plasma raw material onto the incident area where the energy beam is incident to generate plasma; and a radiation extraction section located above the front surface of the plate member and having an emission aperture and an emission protrusion for extracting a certain continuous part of radiation from the generated plasma through the emission aperture along a predetermined emission axis in the emission protrusion, wherein the plate member is disposed such that the normal axis in the incident area outside of a predetermined angular range between the incident axis and the emission axis.

2. The light source apparatus according to claim 1, further comprising a chamber that accommodates the plate member, wherein the beam introduction section includes an incident chamber connected to the chamber and the incident aperture that allows the energy beam to enter the chamber from the incident chamber, and the plate member is disposed such that the normal axis is off from an opening of the incident aperture.

3. The light source apparatus according to claim 2, wherein the chamber has an inside thereof maintained in a more reduced-pressure atmosphere than that of the incident chamber.

4. The light source apparatus according to claim 3, wherein the incident chamber is supplied with gas to increase its internal pressure.

5. The light source apparatus according to claim 2, wherein the beam introduction section includes the incident protrusion protruding toward the incident area from the chamber and including the incident aperture at an end of the incident protrusion.

6. The light source apparatus according to claim 5, wherein the incident protrusion has a cone shape with a cross-sectional area that decreases toward an end of the incident protrusion.

7. The light source apparatus according to claim 1, further comprising a chamber that accommodates the plate member, wherein the radiation extraction section includes an emission chamber connected to the chamber and the emission aperture that allows the radiation to enter the emission chamber from the chamber, and the plate member is configured such that the normal axis is off from an opening of the emission aperture.

8. The light source apparatus according to claim 7, wherein the chamber has an inside thereof maintained in a more reduced-pressure atmosphere than that of the emission chamber.

9. The light source apparatus according to claim 8, wherein the emission chamber is supplied with gas to increase its internal pressure.

10. The light source apparatus according to claim 7, wherein the radiation extraction section includes the emission protrusion protruding from the chamber toward the incident area and including the emission aperture at an end of the emission protrusion.

11. The light source apparatus according to claim 10, wherein the emission protrusion has a cone shape with a cross-sectional area that decreases toward an end of the emission protrusion.

12. The light source apparatus according to claim 10, further comprising a voltage applying section that applies a voltage to the emission protrusion.

13. The light source apparatus according to claim 1, further comprising a gas supply section that blows gas in a direction from the predetermined angular range toward the normal axis such that the normal axis is located downstream from the between-axes area.

14. The light source apparatus according to claim 1, wherein the predetermined angular range includes a three-dimensional volume constituted by extending a two-dimensional area between the incident axis and the emission axis in a plane including the incident axis and the emission axis, along a normal direction of the plane.

15. The light source apparatus according to claim 1, wherein at least either of an angle formed with the incident axis and the normal axis or an angle formed with the emission axis and the normal axis is configured to be included in a range from 30 degrees to 60 degrees.

16. The light source apparatus according to claim 15, wherein each of the angle formed with the incident axis and the normal axis and the angle formed with the emission axis and the normal axis is configured to be included in a range from 30 degrees to 60 degrees.

17. The light source apparatus according to claim 1, wherein the radiation includes X-rays or extreme ultraviolet light.

18. The light source apparatus according to claim 1, further comprising a thickness adjustment mechanism that adjusts a thickness of the plasma raw material supplied to the front surface.

19. The light source apparatus according to claim 1, wherein the emission protrusion further comprises collectors located inside the emission protrusion.

* * * * *